United States Patent
Nakagawa et al.

(10) Patent No.: US 7,517,093 B2
(45) Date of Patent: Apr. 14, 2009

(54) PROJECTION-TYPE SYSTEM AND METHOD OF OPERATING THE SAME

(75) Inventors: Atsuji Nakagawa, Himeji (JP); Toshitaka Fujii, Himeji (JP)

(73) Assignee: Phoenix Electric Co., Ltd., Himeji (JP)

( * ) Notice: Subject to any disclaimer, the term of this patent is extended or adjusted under 35 U.S.C. 154(b) by 423 days.

(21) Appl. No.: 10/575,808

(22) PCT Filed: Jul. 15, 2004

(86) PCT No.: PCT/JP2004/010518
§ 371 (c)(1),
(2), (4) Date: Apr. 11, 2006

(87) PCT Pub. No.: WO2006/008821
PCT Pub. Date: Jan. 26, 2006

(65) Prior Publication Data
US 2007/0076175 A1     Apr. 5, 2007

(51) Int. Cl.
G03B 21/14     (2006.01)
(52) U.S. Cl. .............................. 353/85; 353/84; 348/743
(58) Field of Classification Search ................... 353/84, 353/85, 31; 349/5, 7, 8, 9; 348/742, 743, 348/771
See application file for complete search history.

(56) References Cited

U.S. PATENT DOCUMENTS 5,608,294 A    3/1997   Derra et al.
6,400,511 B2 * 6/2002   Vanlier et al. ................ 359/634
6,520,648 B2 * 2/2003   Stark et al. ..................... 353/85
6,631,996 B2   10/2003  Moench et al.
7,283,181 B2 * 10/2007  Allen et al. ................... 348/744
7,303,287 B2 * 12/2007  De Vaan ........................ 353/85
7,306,340 B2 * 12/2007  Nakagawa et al. ............. 353/85
2001/0022692 A1  9/2001  Vanlier et al.
2002/0008851 A1  1/2002  Moench et al.
2007/0097332 A1 * 5/2007  Kubo ............................ 353/84

FOREIGN PATENT DOCUMENTS

| JP | 10-501919    | 2/1998 |
| JP | 2002-049097  | 2/2002 |
| JP | 2003-518643  | 6/2003 |
| JP | 2003-272879  | 9/2003 |
| JP | 2004-045989  | 2/2004 |
| JP | 2004-212890  | 7/2004 |

* cited by examiner

Primary Examiner—William C Dowling
(74) Attorney, Agent, or Firm—Jordan and Hamburg LLP

(57) ABSTRACT

An object of the invention is to provide method of operating a projection-type system, which method is capable of suppressing flicker and minimizing gradation disorder at the same time by superimposing a pulse current on a d.c. lamp current to stabilize arc while synchronizing the superimposition of the pulse current on the d.c. lamp current with a predetermined segment. The method of operating a projection-type system configured to pass light emitted from a high-pressure discharge lamp lit by d.c. lighting through divided plural color segments sequentially to project an image onto a screen, includes superimposing a pulse current on a d.c. lamp current in the high-pressure discharge lamp in synchronism with at least one specific color segment.

10 Claims, 4 Drawing Sheets

PROJECTION-TYPE SYSTEM AND METHOD OF OPERATING THE SAME

TECHNICAL FIELD

The present invention relates to a projection-type system incorporating an optical element such as a color filter and a method of operating the same.

BACKGROUND ART

Known projection-type systems, such as a projector, include the invention described in Japanese Patent Laid-Open Publication No. 2002-49097. This invention is an application of the invention described in U.S. Pat. No. 5,608,294 (Japanese Patent Announced Publication No. HEI 10-501919), i.e., a known method of a.c. lighting a high-pressure discharge lamp such that "arc flicker can be suppressed by superimposing a pulse current (which is a pulse current of the same polarity as the lamp current and generated for a duration that is reduced from a half cycle of the lamp current by a factor of a predetermined number) on a portion of the latter half of each half cycle of a.c. lamp current (C). The invention is to provide an optimal projection-type system having a reduced possibility of gradation disorder by superimposing such a pulse current on the lamp current in synchronism with a specific color segment of the color filter incorporated in this projection-type system. The "gradation" means the level (degree) of lightness varying on a digital basis in such a manner as white→gray→black. If disorder of gradation occurs, the lightness of each color in an image projected on a screen also falls into disorder.

FIG. 3 is a diagram illustrating the waveform of a.c. lamp current (C) and the waveform of light (Φ) applied to a color filter according to the aforementioned conventional art, and FIG. 5 is a view illustrating electrodes and a state of arc in the a.c. lamp (C). Projection-type systems of this kind involve the following problems caused by the use of alternate current as lamp current (C). That is, (i) the luminescent spot of arc (A') appears at two points (K1') and (K2') because the direction of emission of electrons between electrodes (1a') and (1b') in a high-pressure discharge lamp changes as the a.c. lamp current (C) alternates between a positive half cycle (c1) and a negative half cycle (c2). Specifically, the luminescent spot (K1') (K2') of arc (A') appears not at the midpoint between the electrodes (1a') and (1b') but at a point closer to one electrode (1a') or (1b'). Accordingly, in the case of a.c. lighting, luminescent spots (K1') and (K2') are produced alternately as current (C) alternates. That is, the luminescent spot (K1') appears during positive half cycle (C1) of current (C), while the luminescent spot (K2') appears during negative half cycle (C1) of current (C).

Since the two electrodes (1a') and (1b') are not completely identical with each other, the condition of electrons emitted from alternate one of the electrodes (1a') and (1b') varies as the direction of current (C) flowing across the electrodes (1a') and (1b') alternates. This means that the condition of light emitted from the high-pressure discharge lamp varies as the half cycles (c1) and (c2) alternate with each other. Stated otherwise, light (Φ) produced by emission of electrons and applied to the color filter during positive half cycle (c1) and light (Φ) applied to the color filter during negative half cycle (c2) are not exactly the same, and an error ΔΦ takes place therebetween. Such an error causes gradation disorder in a projection-type system employing such an optical element (4) as a DMD (digital mirror device).

(ii) Moreover, since the polarity alternates after superimposition of pulse current according to the aforementioned conventional art as described above, a variation in luminous flux with varying current (C) describes a complicated waveform having an underchute (U). Since it is required that such light (Φ) varying complicatedly be applied to a desired color segment of the color filter incorporated in the projection-type system, the DMD need be controlled in order to obtain a required color balance by correcting and controlling the variation in luminous flux.

However, a variation in the waveform of luminous flux corresponding to a portion of the lamp current on which the pulse current is superimposed is very complicated and is difficult to reproduce. For this reason, even under the aforementioned control for correction, the projection-type system employing such a DMD cannot completely resolve the gradation disorder. This is the cause of a gradation disorder specific to the use of an a.c. lamp. Thus, the pulse waveform obtained during positive half cycle (c1) is not exactly the same as that obtained during negative half cycle (c2). The influence from this phenomenon becomes particularly great when the pulse current is superimposed on a.c. lighting current (C) in synchronism with a color segment other than the white segment, for example, a red color segment.

(iii) In addition, in the case of the conventional method of superimposing pulse current (P) on a.c. lamp current (C), the position where pulse current (P) is to be superimposed for preventing the occurrence of flicker is limited to a portion of the latter half of each of half cycles (c1) and (c2). Stated otherwise, it is impossible to superimpose pulse current (P) at a desired position and, hence, it is difficult to superimpose pulse current (P) synchronously with plural segments (3a) . . . of the color filter. If such superimposition is done forcibly, the waveform obtained during positive half cycle (c1) differs from that obtained during negative half cycle (c2) and a d.c. component is produced in a.c. lamp current (C), which is considered to affect the life characteristic of the high-pressure discharge lamp undesirably.

Patent Document 1: Japanese Patent Laid-Open Publication No. 2002-49097

Patent Document 2: U.S. Pat. No. 5,608,294 (Japanese Patent Announced Publication No. HEI 10-501919)

DISCLOSURE OF INVENTION

An object of the present invention is to provide a projection-type system which is capable of suppressing flicker caused by arc jump and minimizing gradation disorder at the same time by superimposing a pulse current on a d.c. lamp current to stabilize arc while synchronizing the superimposition of the pulse current on the d.c. lamp current with a predetermined segment (including cases where the superimposition of the pulse current is synchronized with plural segments), as well as a method of operating the same. The method of operating a projection-type system configured to pass light (Φ) emitted from a high-pressure discharge lamp (1) lit by d.c. lighting through divided plural color segments (3a) . . . of a color filter (3) sequentially to project an image onto a screen (7), characterized by superimposing a pulse current (P) on a d.c. lamp current (R) for steady lighting of the high-pressure discharge lamp (1) in synchronism with at least one specific color segment. Since the current (R) for lighting the high-pressure discharge lamp (1) is a direct current, the pulse current (P) can be superimposed thereon at any point in time. Therefore, the superimposition of the pulse current (P)

can be made in synchronism with one or plural specific color segments (3a) . . . , which is very difficult if an a.c. lamp current (C) is used.

Also, since the lamp lighting current (R) is a direct current, it becomes possible to avoid the aforementioned gradation disorder specific to an alternating current, which is unavoidable if the lamp current (C) is an alternating current. What is more, the current waveform is very simple even when the pulse current (P) is superimposed and, hence, the waveform of variation in luminous flux with varying current waveform is also very simple with no underchute. For this reason, control for correction of the variation in luminous flux becomes very simple, which makes it possible to minimize the gradation disorder.

BEST MODE FOR CARRYING OUT THE INVENTION

Figure 1:
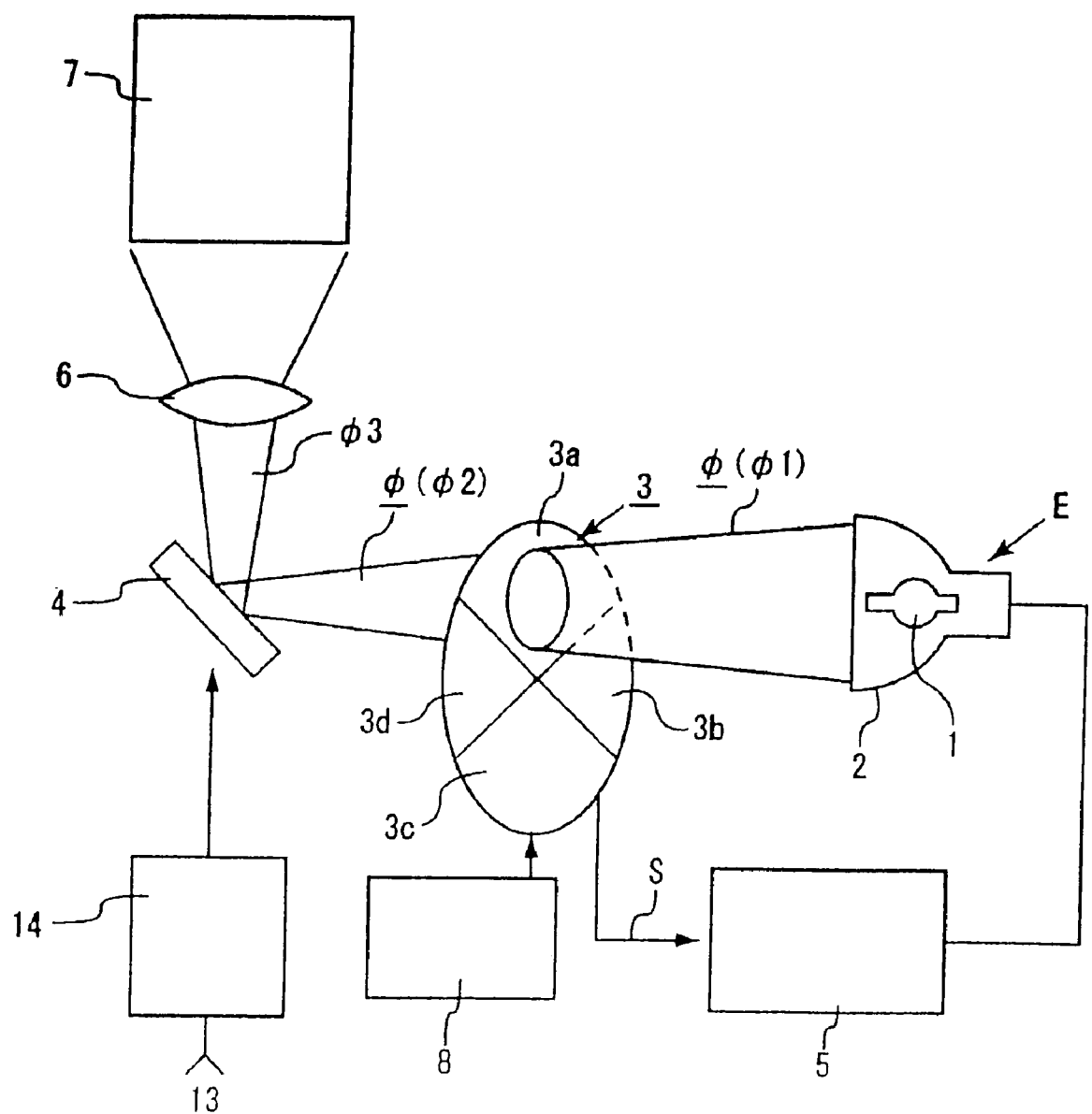
FIG. 1 is a block diagram according to the present invention.

Hereinafter, the present invention will be described in detail with reference to embodiments shown in the accompanying drawings. FIG. 1 illustrates a projection-type system as one embodiment of the present invention. Here, the projection-type system is adapted to a video picture of 60 Hz for example. Of course, the present invention is not limited thereto. The projection-type system uses a high-pressure discharge lamp (1) as a light source (E) which is fitted on a reflector (2) and configured to be lit with a d.c. lamp current (R) fed from d.c. lighting means (5). Light emitted from the high-pressure discharge lamp (1) is applied to a color filter (3) disposed in front of the lamp (1) either directly or by reflection from the reflector (2).

One example of color filter (3) comprises a rotary disk divided into three color segments including red color segment (3a), green color segment (3b) and blue color segment (3c) or into four color segments including a white color segment (3d) in addition to the aforementioned three color segments, each of which comprises a dichroic filter having the property of allowing visible light wavelengths to pass therethrough selectively. The color filter (3) is rotatable about its axis and is controlled by a color filter driver (8) so as to rotate at a constant velocity. Where the video frequency is 60 Hz per frame for example (i.e., an image varies 60 times per second within one frame) and the color filter (3) rotates at a velocity twice as high as the speed of this variation for example, the velocity of rotation of the color filter 3 is 120 Hz.

Light (9p) from the light source (E) is applied to the segments (3a), (3b), (3c) . . . of the color filter (3) rotating at a constant velocity sequentially on a time-sharing basis, so that light (φ2) having passed through the segments (3a), (3b), (3c) . . . of the color filter (3) becomes colored red, green, blue and optional white, corresponding to respective of the segments sequentially.

Light (φ2) having passed through the segments (3a), (3b), (3c) . . . of the color filter (3) is reflected at the surface of an optical element (4) and then passes through a projection lens system (6) to form an image. At that time, reflected light (φ3) from the surface of the optical element (4) is modulated according to video information transferred to the optical element (4) from an optical element driver (14) receiving video information from a video input section (13).

When a pulse current (P) is superimposed on the lamp current, light (φ1) emitted from the high-pressure discharge lamp (1) varies as described earlier. Variation of light (φ2) is corrected at the time of reflection by a DMD before modulation to minimize gradation disorder. This feature will be described further.

Figure 2:
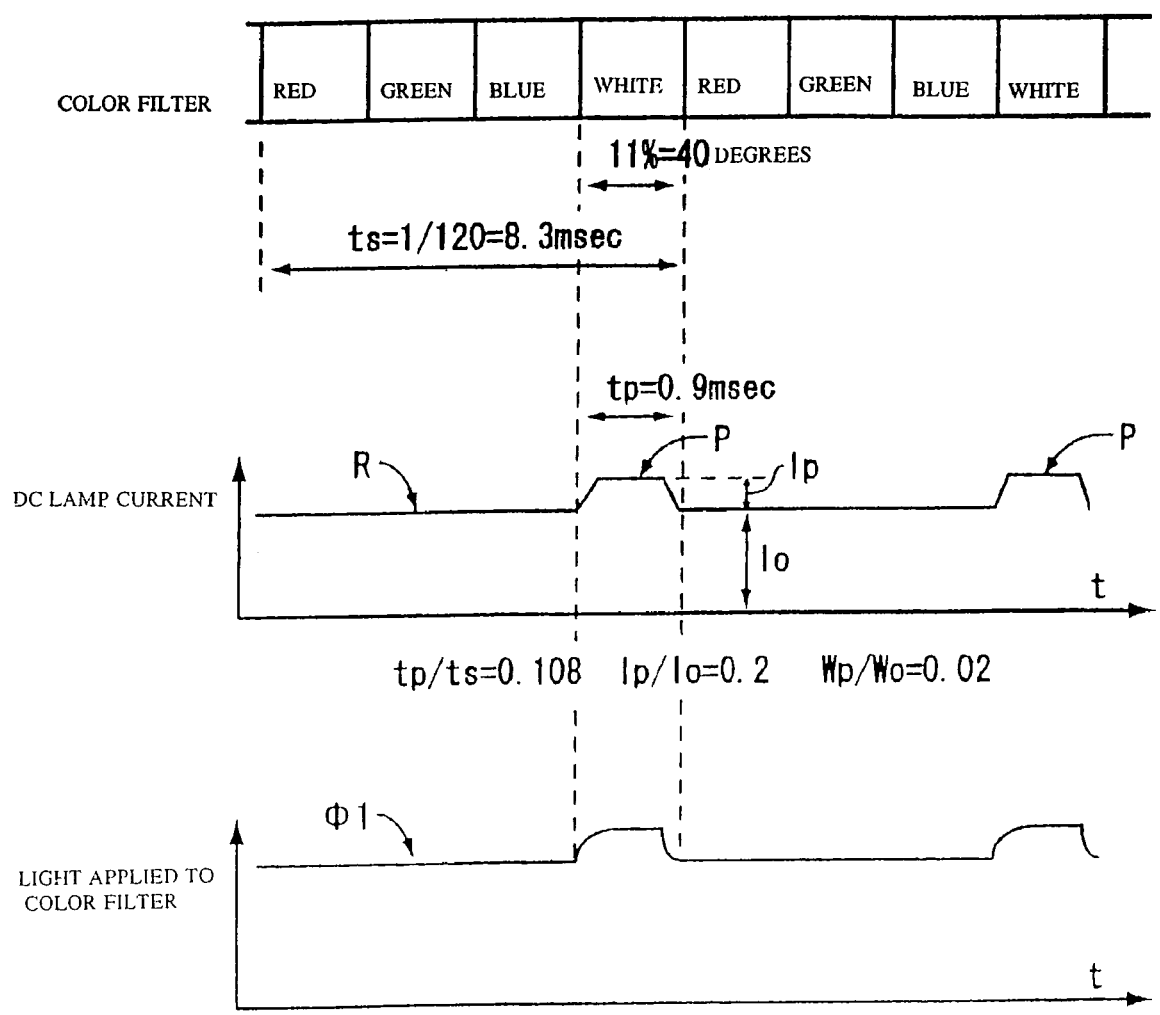
FIG. 2 is a diagram illustrating the relationship between the waveform of a d.c. lamp current on which a pulse current is superimposed and light emitted from a discharge lamp according to the present invention.
Figure 3:
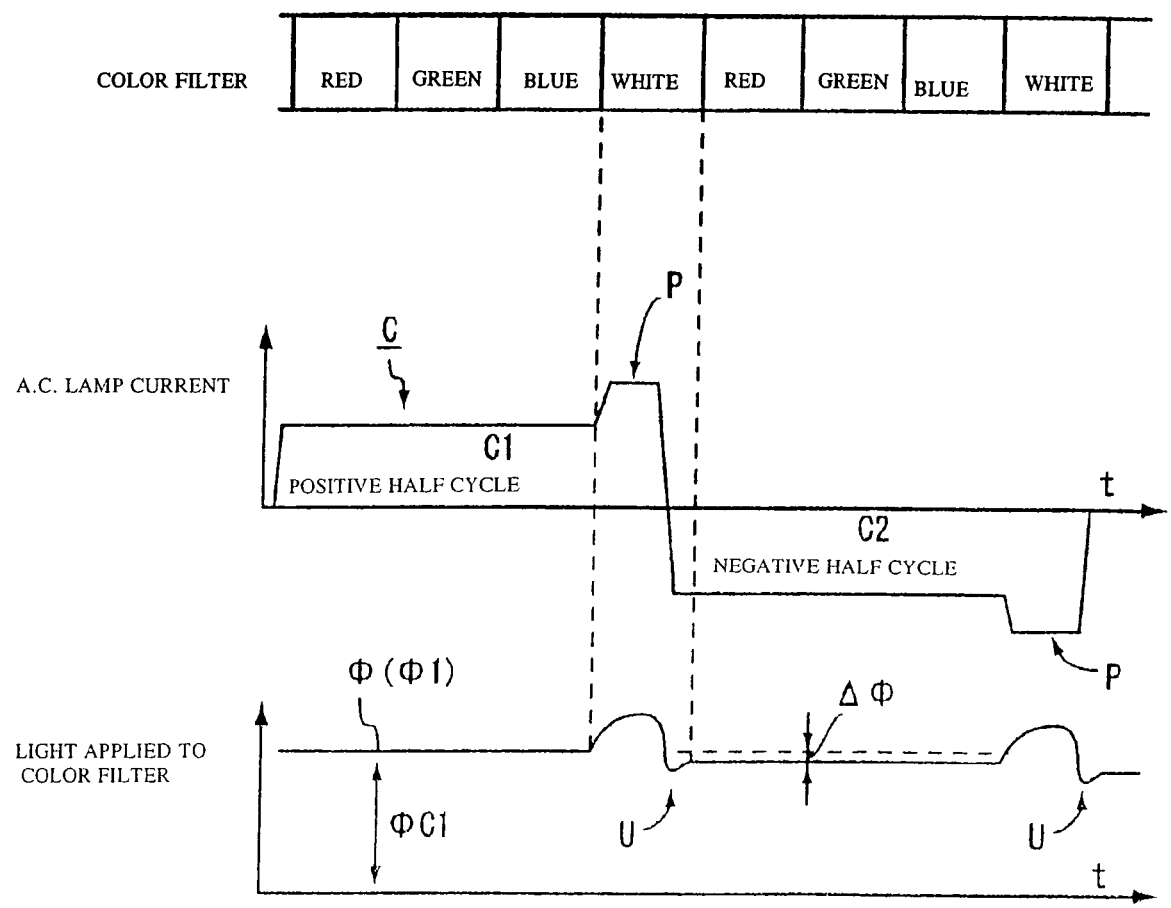
FIG. 3 is a diagram illustrating the relationship between the waveform of an a.c. lamp current on which a pulse current is superimposed and light emitted from a discharge lamp according to the conventional art.

FIG. 2 shows the waveform of a d.c. lamp current (R) on which a pulse current (P) is superimposed and the waveform of light (φ1) applied to the color filter (3). A synchronizing signal (S) from the color filter (3) is inputted to the d.c. lighting means (5). In synchronism with the synchronizing signal (S) the d.c. lamp current (R) on which the pulse current (P) is superimposed is fed to the high-pressure discharge lamp (1).

Where the lamp current (R) is a direct current, the polarity does not alternate after superimposition of the pulse current (P) and, accordingly, the variation in luminous flux describes a simple waveform with essentially no underchute (U). A required color balance is obtained in such a manner that: the pulse current (P) is superimposed on the d.c. lamp current (R) in synchronism with a predetermined one of the color segments (3a), (3b), (3c) . . . of the color filter (3); the variation in luminous flux caused by superimposition of the pulse current (P) is corrected and controlled by means of the DMD; and then corrected and controlled light is allowed to be reflected. Since the waveform of luminous flux corresponding to a portion of the lamp current on which the pulse current (P) is superimposed is simple and periodically reproducible, the waveform of luminous flux is less likely to cause gradation disorder in the projection-type system employing such a DMD. The influence of the waveform of luminous flux is little particularly where light passes through a color segment other than the white color segment, for example, red color segment (3a).

Figure 4:
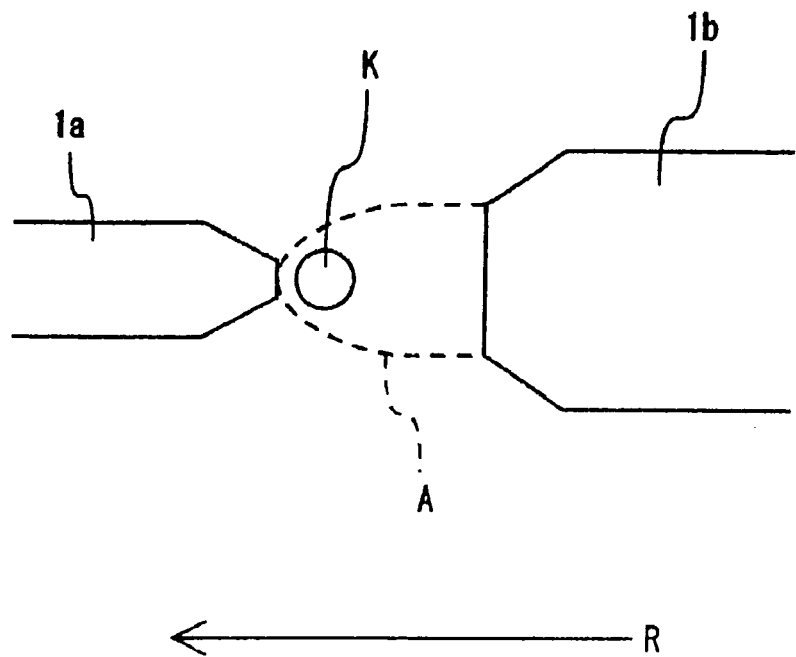
FIG. 4 is a front view showing a state where arc and a luminescent spot are produced during d.c. lighting.
Figure 5:
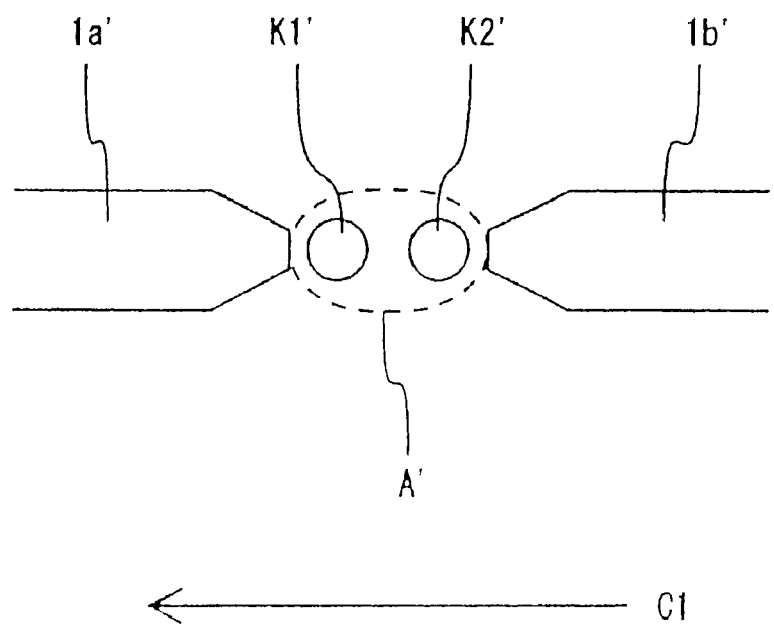
FIG. 5 is a front view showing a state where arc and luminescent spots are produced during a.c. lighting.

FIG. 4 shows a state of electrodes and arc with the d.c. lamp current (R). Unlike a conventional a.c. lamp, the d.c. lamp (1) causes electrons to be emitted in a constantly fixed direction between the electrodes (1a) and (1b). If arc (A) is stabilized, a luminous spot (K) of arc (A) is rendered essentially stationary. Under such a condition, the combination of the d.c. lamp (1) and the reflector (2) makes constant the luminous flux (φ1) applied to the color filter (3).

In the case of a projector for business use, it is a general practice to make superimposition of the pulse current (P) in synchronism with white segment (3d) of the color segments (3a) . . . . Advantages of this practice include least influence on gradation, and improved illuminance of the resulting image. In the case of a projector for home theater, on the other hand, use is generally made of color filter (3) comprising three-color filters (3a) . . . , i.e., red, green and blue, with white segment (3d) precluded because importance is attached to colors of an image. In this case, it is a general practice to make superimposition of the pulse current (P) in synchronism with red segment (3a). This is because well-balanced color control can be achieved if the luminous flux of light passing through red segment (3*a*) is enhanced by means of the pulse current (P) since the high-pressure discharge lamp (1) usually has spectral characteristics somewhat short of a red component.

As the case may be, it is possible to make superimposition of pulse currents (P) having different pulse widths in synchronism with respective of white and green segments (3*d*) and (3B) for example. In the case of d.c. lighting, there is no need to pay attention to alternation of the polarity which is essential to a.c. lighting. For this reason, superimposition of the pulse current (P) can be made with a high degree of freedom, i.e., at a desired position and with a desired width.

FIG. 2 illustrates a case where superimposition of the pulse current (P) is made in synchronism with one specific segment. In cases where superimposition of the pulse current (P) is made in synchronism with white segment (3*d*), the share of the white segment (3*d*) is typically 11% per rotation of the color filter (3), which is equivalent to an angle of about 40°. If the number of rotations of the color filter (3) is 120 Hz, the maximum pulse width (tp) which can be superimposed in synchronism with the white segment (3*d*) can be found by the formula:

$$(tp)=(ts)\times(40°/360°) \quad \text{(formula 1)}$$

where (ts) represents the pulse period and is equal to 1/120 Hz.

From the formula, the maximum pulse width (tp) which can be superimposed in synchronism with the white segment (3*d*) is 0.9 msec.

With respect to the electric power of the pulse current (P) to be superimposed on the d.c. lamp current (R), the pulse superimposing power to be fed to the high-pressure discharge lamp (1) is preferably not less than 1% of the rated power of the high-pressure discharge lamp (1). The occurrence of arc jump can be suppressed remarkably and quickly by merely superimposing such a relatively small pulse current (P) on the d.c. lamp current (R). Although the mechanism of this effect is not very clear at present, it seems that the temperature of a current arc spot from which the generation of arc is started is raised periodically by the pulse superimposing power, which betters electron emission from the current arc spot before the arc spot moves from the current arc spot to another spot thereby improving the arc stability.

It has been found from the results of experiments that the occurrence of flicker due to the aforementioned arc jump can be satisfactorily suppressed if the pulse superimposing power fed to the high-pressure discharge lamp (1) is 1% of the rated power of the high-pressure discharge lamp (1). The pulse superimposing power is preferably in the range from 2% to 7% of the rated power. (In this case the occurrence of flicker can be prevented substantially completely.) The upper limit of the pulse superimposing power is 20% of the rated power. If the pulse superimposing power is more than 20% of the rated power of the high-pressure discharge lamp (1), the pulse superimposing power is excessive relative to the rated power and, hence, lighting is not based on d.c. current any more but is chiefly based on pulse current. In this way, according to the present invention, the stability of arc (A) can be improved by using a relatively feeble pulse current (P) and, hence, a projection-type system of the type employing a DMD can be constructed which is subject to less influence on gradation.

Japanese Patent Announced Publication No. HEI 10-501919 describes the art of superimposing pulse current (P) on a portion of the latter half of each half cycle (*c*1)(*c*2) of a rectangular a.c. lamp current (C) thereby making it possible to suppress the occurrence of flicker of discharge arc (A). However, this art is based on a.c. lighting and, therefore, is different from the present invention based on d.c. lighting in lighting mechanism, hence, in flicker preventing mechanism.

Specifically, according to experiments conducted by the inventors of the present invention, the effect resulting from superimposition of the pulse current (P) according to Japanese Patent Announced Publication No. HEI 10-501919 is based on the mechanism wherein: a conspicuous projection appears on a flat surface (smooth spherical or plane surface) of the tip end of each of a.c. electrodes (1*a*') and (1*b*'); and this projection functions as an arc spot to fix the arc generating position, thereby stabilizing arc (A). The time required until such a suitable projection was formed was 20 minutes to 2 hours depending upon the shapes of the a.c. electrodes (1*a*') and (1*b*'). Due to the formation of the projection, the lamp voltage tended to drop conspicuously (5-20 V) once from the beginning of use.

According to the d.c. lighting of the present invention, in contrast, any conspicuous projection is not formed on the tip end of each electrode by the pulse current (P) superimposed on the d.c. lamp current (R) even when a flat portion on the tip end of each electrode increases due to consumption or deterioration of the electrode tip end. Arc (A) becomes stabilized and is generated from one stationary arc spot after about a dozen of seconds. Essentially no tendency of voltage drop is found and a variation in voltage falls within 5 V if it occurs. Thus, the method of superimposing the pulse current (P) on the d.c. lamp current (R) according to the present invention is completely different in mechanism from the art of Japanese Patent Announced Publication No. HEI 10-501919.

Next, examination will be made of the pulse current superimposing conditions. The pulse repetition period (ts) of the pulse current (P) is determined to fall within the range from 0.2 msec to 20 msec (by the reason to be stated later); as the pulse height value, the ratio (Ip/Io) of a mean pulse height (Ip) of the pulse current (P) to a mean current value (Io) of the lamp current is determined to fall within the range from 0.1 to 2 (by the reason to be stated later); and the ratio (tp/ts) of an effective pulse width (tp) of the pulse current (P) to the pulse repetition period (ts) of the pulse current (P) is determined to fall within the range from 0.005 to 0.5 (by the reason to be stated later).

FIG. 2 illustrates one example of a pulse current waveform. In the case where superimposition of the pulse current (P) is made in synchronism with white segment (3*d*), the following values are found from the formula (1) obtained from the aforementioned conditions of the color filter (3).

Pulse repetition period (ts) of the pulse current (P)=8.3 msec

Effective pulse width (tp) of the pulse current (P)=0.9 msec (*tp/ts*)=0.108

Here, (Ip/Io)=0.2 is selected as the pulse height value.

According to the experiments conducted by the inventors of the present invention, if (Ip/Io)<0.1, the arc jump suppressing effect was hardly observed; if 0.1<(Ip/Io)<0.2, the arc jump suppressing effect was observed but was insufficient with arc jump still observed; and if (Ip/Io)>0.2, a considerable arc jump suppressing effect was observed. For this reason, (Ip/Io)=0.2 is selected here as a typical of a minimum value with which the arc jump suppressing effect becomes considerable. The ratio (Wp/Wo) of the pulse superimposing power (Wp) to the rated power (Wo) is equal to (Ip/Io)×(tp/ts). It follows that the ratio (Wp/Wo) assumes 0.2×0.108=0.0216, i.e., about 2% in this example. The above-noted pulse repetition period (ts) of the pulse current is selected from the range from 0.2 msec to 20 msec.

If the pulse repetition period (ts) of the pulse current (P) is more than 20 msec, the arc jump suppressing effect weakens because the superimposed pulse component is lessened. The range which can avoid the influence of sound resonance is not more than 5 kHz (=1/5000). If this range is reduced to the pulse repetition period (ts) of the pulse current, we have the range from 0.2 msec (=1/5000) to 20 msec (=1/50). That is, if the pulse repetition period of the pulse current is established to fall within the range from 0.2 msec to 20 msec, it is possible to avoid the influence of sound resonance, maintain the arc jump suppressing effect, and prevent a resulting image from being affected even when the pulse current is superimposed on the d.c. current.

The ratio (Ip/Io) of mean pulse height (Ip) of the pulse current (P) to mean current value (Io) of the d.c. lamp current (R) is determined as being not less than 0.1 because if the ratio (Ip/Io) is less than 0.1, the pulse superimposing power is too small, which causes the arc jump suppressing effect to lower steeply. If the ratio (Ip/Io) is more than 2, the current operating the lighting device is excessively large. Thus, by establishing the ratio (Ip/Io) of mean pulse height (Ip) of the pulse current (P) to mean current value (Io) of the lamp current to fall within the range from 0.1 to 2, steady-state lighting without arc jump becomes possible.

Further, since the minimum value of the pulse width (tp) is 0.1 msec when the pulse repetition period (ts) assumes the maximum of 20 msec as described above, the minimum value (0.005) of the ratio (tp/ts) of effective pulse width (tp) to pluse repetition period (ts) of the pulse current (P) is found from 0.1 msec/20 msec. (The minimum value of pulse width (tp) is a minimum value which can be realized from the response speed of the lighting device.) On the other hand, when the mean pulse height ratio (Ip/Io) assumes the maximum of 2, the pulse superimposing power (Wp/Wo) is 0.01, or 1%. Here, (Wp/Wo)=(Ip/Io)×(tp/ts). The maximum value is effective until a maximum duty of 0.5 which the pulse superimposing current can assume.

As described above, it is possible to suppress the occurrence of arc jump reliably without affecting an image on the optical system if the conditions of the pulse current to be superimposed are established to satisfy the aforementioned three conditions.

INDUSTRIAL APPLICABILITY

As has been described above, the present invention applies to a projection-type system a method of lighting a high-pressure discharge lamp characterized by superimposing a pulse current on a d.c. lamp current to stabilize arc generated in the high-pressure discharge lamp thereby making is possible to suppress the occurrence of arc jump and hence is capable of providing an optimal projection-type system which can minimize gradation disorder by superimposition of the pulse current in synchronism with at least one specific color segment of a color filter included in the projection-type system.

The invention claimed is:

1. A method of operating a projection-type system configured to pass light emitted from a high-pressure discharge lamp lit by d.c. lighting through divided plural color segments of a color filter sequentially to project an image onto a screen, comprising:
   superimposing a pulse current on a d.c. lamp current in synchronism with at least one specific color segment of the color segments, wherein:
   a pulse repetition period (ts) of the pulse current (P) is within a range from 0.2 msec to 20 msec;
   a ratio (Ip/Io) of a mean pulse height (Ip) of the pulse current (P) to a mean current value (Io) of the lamp current is within a range from 0.1 to 2; and
   a ratio (tp/ts) of an effective pulse width (tp) of the pulse current (P) to the pulse repetition period (ts) of the pulse current (P) is within a range from 0.005 to 0.5.

2. The system of claim 1, wherein the color filter comprises a rotatable color wheel divided into divided segments on a color basis.

3. The method claim 1, wherein the color filter comprises a rotatable color wheel divided into divided segments on a color basis.

4. The method claim 1, wherein:
   the color filter comprises divided four color segments which are colored red, green, blue and white, respectively; and
   the pulse current is superimposed within confines of the white segment.

5. The method claim 1, wherein:
   the color filter comprises divided three color segments which are colored red, green and blue, respectively; and
   the pulse current is superimposed within confines of the red segment.

6. The method claim 1, wherein a pulse superimposing power fed to the high-pressure discharge lamp is not less than 1% of a rated power of the high-pressure discharge lamp.

7. A projection-type system for projecting an image onto a screen, comprising:
   a high-pressure discharge lamp lit by d.c. lighting;
   a color filter having divided plural color segments disposed to have light emitted from the high-pressure discharge lamp pass through the divided plural color segments sequentially; and
   d.c. lighting means for lighting the high-pressure discharge lamp by feeding a d.c. lamp current to the high-pressure discharge lamp while superimposing a pulse current on the d.c. lamp current periodically, the pulse current being superimposed in synchronism with at least one specific color segment, wherein:
   a pulse repetition period (ts) of the pulse current (P) is within a range from 0.2 msec to 20 msec;
   a ratio (Ip/Io) of a mean pulse height (Ip) of the pulse current (P) to a mean current value (Io) of the lamp current is within a range from 0.1 to 2; and
   a ratio (tp/ts) of an effective pulse width (tp) of the pulse current (P) to the pulse repetition period (ts) of the pulse current (P) is within a range from 0.005 to 0.5.

8. The system of claim 7, wherein:
   the color filter comprises divided four color segments which are colored red, green, blue and white, respectively; and
   the pulse current is superimposed within confines of the white segment.

9. The system of claim 7, wherein:
   the color filter comprises divided three color segments which are colored red, green and blue, respectively; and
   the pulse current is superimposed within confines of the red segment.

10. The system of claim 7, wherein a pulse superimposing power fed to the high-pressure discharge lamp is not less than 1% of a rated power of the high-pressure discharge lamp.

* * * * *